United States Patent
Feng et al.

(10) Patent No.: US 12,444,020 B2
(45) Date of Patent: Oct. 14, 2025

(54) FLEXIBLE IMAGE ASPECT RATIO USING MACHINE LEARNING

(71) Applicant: GOOGLE LLC, Mountain View, CA (US)

(72) Inventors: Xiao Feng, Mountain View, CA (US); Yuanzhen Li, Mountain View, CA (US); Yihui Wang, Mountain View, CA (US); Omer Gimenez Llach, Mountain View, CA (US); Han Xu, Mountain View, CA (US); Mengjie Wang, Mountain View, CA (US); Huiwen Chang, Mountain View, CA (US); AJ Maschinot, Mountain View, CA (US); Dilip Krishnan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/028,063

(22) PCT Filed: May 20, 2022

(86) PCT No.: PCT/CN2022/094121
§ 371 (c)(1),
(2) Date: Mar. 23, 2023

(87) PCT Pub. No.: WO2023/221093
PCT Pub. Date: Nov. 23, 2023

(65) Prior Publication Data
US 2024/0311960 A1    Sep. 19, 2024

(51) Int. Cl.
*G06T 3/4046* (2024.01)

(52) U.S. Cl.
CPC ................ *G06T 3/4046* (2013.01)

(58) Field of Classification Search
CPC ........... G06T 3/4046; G06T 5/60; G06T 5/77; G06T 2207/20081; G06T 2207/20084; G06T 2207/20132; G06T 2210/22
See application file for complete search history.

(56) References Cited

U.S. PATENT DOCUMENTS 9,418,283 B1 * 8/2016 Natarajan .............. G06V 20/63
10,147,163 B2   12/2018 Welinder et al.
(Continued)

OTHER PUBLICATIONS

Sabini et al. "Painting Outside the Box: Image Outpainting with GANs" (Year: 2018).*

(Continued)

*Primary Examiner* — Kent W Chang
*Assistant Examiner* — Karl Duc Truong
(74) *Attorney, Agent, or Firm* — MARSHALL, GERSTEIN & BORUN LLP

(57) ABSTRACT

To adjust an aspect ratio of an image to match the aspect ratio of a display area for presenting the image, a computing device receives an image having a first aspect ratio, and obtains a second aspect ratio for a display area of a display in which to present the image, where the second aspect ratio is different from the first aspect ratio. The computing device extends the image to include one or more additional features which were not included in the image. Additionally, the computing device automatically crops the extended image around an identified region of interest by selecting a portion of the extended image that has an aspect ratio which matches the second aspect ratio of the display area, and provides the cropped image for presentation within the display area of the display.

20 Claims, 12 Drawing Sheets

(56) References Cited

U.S. PATENT DOCUMENTS

| | | | |
|---|---|---|---|
| 10,380,227 B2 | 8/2019 | Metz et al. | |
| 10,484,682 B2 | 11/2019 | Coban et al. | |
| 2010/0091330 A1* | 4/2010 | Marchesotti | G06V 10/25 |
| | | | 382/218 |
| 2021/0084372 A1* | 3/2021 | Seo | H04N 21/4666 |
| 2022/0122222 A1* | 4/2022 | Smith | G06F 3/04847 |
| 2022/0138493 A1* | 5/2022 | Lee | G06T 7/254 |
| | | | 382/103 |
| 2023/0144637 A1* | 5/2023 | Guo | G06T 5/60 |
| | | | 382/298 |
| 2023/0169628 A1* | 6/2023 | Yu | H04N 21/816 |
| | | | 382/100 |
| 2023/0169632 A1* | 6/2023 | Kulkarni | G06T 11/00 |
| | | | 382/276 |

OTHER PUBLICATIONS

Kim, Kyunghun, et al. "Painting Outside as Inside: Edge Guided Image Outpainting via Bidirectional Rearrangement with Step-By-Step Learning." arXiv preprint arXiv:2010.01810 (2020). (Year: 2020).*

Li, Debang, Junge Zhang, and Kaiqi Huang. "Learning to learn cropping models for different aspect ratio requirements." Proceedings of the IEEE/CVF Conference on Computer Vision and Pattern Recognition. 2020. (Year: 2020).*

Ma, Ye, et al. "Boosting image outpainting with semantic layout prediction." arXiv preprint arXiv:2110.09267 (2021). (Year: 2021).*

Kong, Daehyeon, et al. "Image-adaptive hint generation via vision transformer for outpainting." Proceedings of the IEEE/CVF Winter Conference on Applications of Computer Vision. 2022. (Year: 2022).*

International Search Report and Written Opinion for Application No. PCT/CN2022/094121, dated Nov. 16, 2022.

Sabini et al., "Painting Outside the Box: Image Outpainting with GANs," Cornell University Library (Aug. 26, 2018).

Van Hoorick, "Image Outpainting and Harmonization using Generative Adversarial Networks," Cornell University Library (Dec. 23, 2019).

Zhong, "Aesthetic-Guided Outward Image Cropping," ACM Transactions on Graphics, 40(6):1-13 (Dec. 10, 2021).

Drescher et al., "Smart Cropping—Automatically crop images to optimal regions with deep neural networks," (Jul. 24, 2020).

Shan et al., "Photo Uncrop," University of Washington.

* cited by examiner

300

Original Image

3:4

500

Extended Image

FLEXIBLE IMAGE ASPECT RATIO USING MACHINE LEARNING

FIELD OF THE DISCLOSURE

The present disclosure relates to adapting fixed-dimension images provided by a content provider, such as an advertiser, to different dimensions and/or aspect ratios.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A variety of computing devices support browsers or other applications that present images. These images may be presented within particular display areas in a display. For example, advertisements may be presented within predetermined areas within a display, where each display area has a fixed location, size, and/or aspect ratio within the display. When an aspect ratio of an image differs from the aspect ratio of the display area in which the image is presented, the display area may include white space which is undesirable or other visual artifacts associated with the difference in aspect ratios, such as distortion. Additionally, portions of the image may be cut off or removed to fit within the display area, which may result in the loss of significant visual features within the image such as text, an object, or a portion thereof.

SUMMARY

To adapt an image having a first aspect ratio to fit within a display area having a second aspect ratio which is different from the first aspect ratio, an image adjustment system uses a generative adversarial network (GAN), which is a type of machine learning model, for generating image extensions to extend an image to include additional features which were not included in the original image. For example, an original image may include a vehicle in the foreground with a house in the background where the roof of the house is cut off in the image. The image adjustment system may use the GAN to generate an extended version of the image which includes the roof of the house which was not included in the original image.

The GAN may include both a generator and a discriminator. The generator uses an encoder-decoder architecture that takes an input image and a binary mask as input, and generates an extended image as output. The discriminator takes either a naturally generated image or an artificially generated image as input, runs it through a convolutional neural network, and attempts to differentiate artificially generated images from real naturally generated images. The image adjustment system uses a combination of loss functions to train the generator and the discriminator, such as an adversarial loss, a reconstruction loss, and/or a perceptual loss. By using the discriminator, the image adjustment system can identify whether an image is real or generated by the generator. For image extensions, the discriminator identifies not only whether an image looks real, but also whether the generated image extensions looks consistent with the known portions of the input image. To ensure this consistency, the image adjustment system trains the discriminator by including known pixels from the input image in the generated image and using descriptors from naturally generated images.

To reduce artifacts in the generated image, the image adjustment system may perform an augmented inference technique. More specifically, the image adjustment system applies multiple transformations to the input image, such as flipping color channels, slight cropping, flipping left/right, flipping up/down, etc. Then the image adjustment system applies the transformed images to the GAN model, applies reverse transformations to the resulting images, and combines them via a median filter to reduce image artifacts.

The GAN model may be trained using naturally generated images from the real world, such as scenes and objects. In other implementations, the GAN model is trained using naturally generated images by users on computing devices, such as display ad images, or any suitable combination of these.

After an image has been extended using the GAN, the image adjustment system automatically crops the extended image using a selected aspect ratio, such as the aspect ratio of the display area. For example, an original image may have an aspect ratio of 16:9. The display area for presenting the image within a display may have an aspect ratio of 3:4. To adjust the aspect ratio of the image from 16:9 to 3:4 without distorting the image or losing significant visual features within the image such as text or objects, the image adjustment system extends the image using the GAN. Then the image adjustment system automatically crops the extended image, such that the cropped image has an aspect ratio of 3:4. The image adjustment system may automatically crop the extended image using machine learning techniques. More specifically, the image adjustment system may identify a region of interest within the extended image using machine learning techniques and may crop the extended image around the region of interest using the selected aspect ratio.

Then the image adjustment system provides the cropped image for presentation within the display area of the display. In this manner, the cropped image may fill the entire display area without leaving any white space, thereby optimizing screen real estate and improving the user interface. Moreover, by using a GAN to generate the extended portions of the image, the extended image appears more realistic and with less visual artifacts compared to alternative implementations such as color padding, blurring, distorting an image, or cutting off certain portions of the image to fit a selected aspect ratio.

One example embodiment of the techniques of this disclosure is a method for adjusting an aspect ratio of an image. The method includes receiving an image having a first aspect ratio, obtaining a second aspect ratio for a display area of a display in which to present the image, where the second aspect ratio is different from the first aspect ratio, and extending the image to include one or more additional features which were not included in the image. The method also includes automatically cropping the extended image around an identified region of interest by selecting a portion of the extended image that has an aspect ratio which matches the second aspect ratio of the display area, and providing the cropped image for presentation within the display area of the display.

Another example embodiment is a computing device for adjusting an aspect ratio of an image. The computing device includes one or more processors and a non-transitory computer-readable memory coupled to the one or more processors and storing thereon instructions. The instructions, when executed by the one or more processors, cause the computing device to receive an image having a first aspect ratio, obtain a second aspect ratio for a display area of a display in which to present the image, where the second aspect ratio is different from the first aspect ratio, and extend the image to include one or more additional features which were not included in the image. The instructions further cause the computing device to automatically crop the extended image around an identified region of interest by selecting a portion of the extended image that has an aspect ratio which matches the second aspect ratio of the display area, and provide the cropped image for presentation within the display area of the display.

Yet another example embodiment is a computer-readable medium storing instructions for adjusting an aspect ratio of an image. The computer-readable medium may be transitory or non-transitory. The instructions, when executed by one or more processors, cause the one or more processors to receive an image having a first aspect ratio, obtain a second aspect ratio for a display area of a display in which to present the image, where the second aspect ratio is different from the first aspect ratio, and extend the image to include one or more additional features which were not included in the image without blurring or color padding the image. The instructions further cause the one or more processors to provide at least a portion of the extended image having an aspect ratio which matches the second aspect ratio of the display area for presentation within the display area of the display.

DETAILED DESCRIPTION

Overview

Generally speaking, the systems and methods of the present disclosure adjust the aspect ratio of an image so that the image fits within the display area of a display without distorting the image or having white space between the image and the respective display area. The display may be a web page or application screen which presents image content from content providers within predetermined display areas. For example, the image content may include advertisements, photographs, etc.

A content provider may provide an input image to a server device, where the input image has a first aspect ratio. The server device may identify the dimensions and/or aspect ratio of the display area for presenting the input image. For example, the display may include several adjacent display areas for presenting image content. The server device may identify the dimensions and/or aspect ratio for one of the adjacent display areas, or the adjacent display areas may have the same dimensions and/or aspect ratios. The aspect ratio for the display area may be a second aspect ratio which is different from the first aspect ratio.

Then the server device may extend the input image to include additional features which were not included in the input image, for example using a first machine learning model such as a GAN. Accordingly, the server device may increase the dimensions of the input image without adjusting the scale of the input image. Next, the server device automatically crops the extended image using the second aspect ratio around an identified region of interest. In some implementations, the server device identifies a region of interest within the extended image using a second machine learning model. Then the server device generates a rectangular box for cropping the extended image using the second aspect ratio. The server device places the rectangular box around the identified region of interest to crop the extended image. Then the server device provides the cropped image as an output image to a client device for presentation within the display area of the display.

Example Hardware and Software Components

Figure 1:
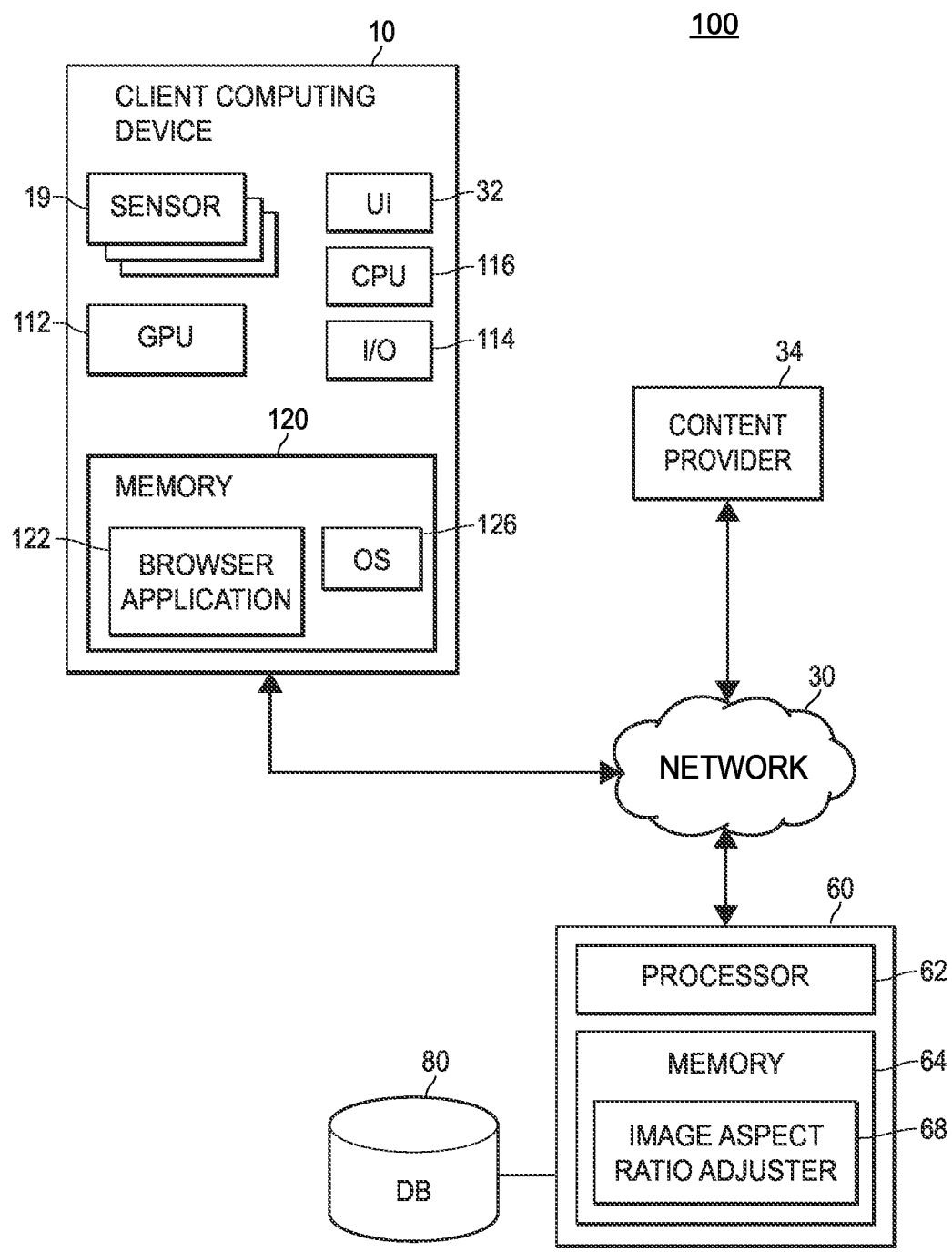
FIG. 1 is a block diagram of an example system in which techniques for adjusting an aspect ratio of an image can be implemented.

Referring to FIG. 1, an example computing environment for an image adjustment system 100 includes a client device 10 configured to execute an application 122 such as a browser application, one or more content providers 34 configured to provide image content (also referred to herein as "input images") for presentation in display areas of a display of the browser application 122, and a server device 60 configured to adjust the aspect ratios of the input images to fit within the respective display areas. The client device 10 may be operated by a user. The browser application 122 may receive, interpret, and/or display web page information while also receiving inputs from the user.

The server device 60 can be communicatively coupled to a database 80 that stores, in an example implementation, a first machine learning model such as a GAN model for generating extended images. The training data used as training input for the first machine learning model may include naturally generated images from the real world, such as scenes and objects as well as naturally generated images by users on computing devices, such as display ad images.

As used herein, naturally generated images may refer to real-world images or images generated on a computing device by a person. Artificially generated images may refer to images at least partially generated by a computing device without user input to generate the image or portion thereof. The training data for the first machine learning model may also include a first set of visual features for naturally generated images and a second set of visual features for artificially generated images.

Additionally, the database 80 may store a second machine learning model for identifying regions of interest (ROIs) within extended images. The training data used as training input for the second machine learning model may include a set of images, a portion of each image in the set indicated as an ROI for the image, and the remaining portion of each image in the set which was not indicated as the ROI for the image.

More generally, the server device 60 can communicate with one or several databases that store any type of suitable content information or image adjustment information. The content provider 34 can provide image content to the server device 60 via a native application or web browser executing on a client device of the content provider 34. For example, the content provider 34 can upload the image content to the server device 60 via an advertisement application or website. The server device 60 may then identify a web page or application screen for presenting the image content, and a specific display area within the web page or application screen in which to present the image content. The devices operating in the image adjustment system 100 can be interconnected via a communication network 30.

In various implementations, the client device 10 may be a smartphone or a tablet computer. The client device 10 may include a memory 120, one or more processors (CPUs) 116, a graphics processing unit (GPU) 112, an I/O module 114 including a microphone and speakers, a user interface (UI) 132, and one or several sensors 19 including a Global Positioning Service (GPS) module. The memory 120 can be a non-transitory memory and can include one or several suitable memory modules, such as random access memory (RAM), read-only memory (ROM), flash memory, other types of persistent memory, etc. The I/O module 114 may be a touch screen, for example. In various implementations, the client device 10 can include fewer components than illustrated in FIG. 1 or conversely, additional components. In other embodiments, the client device 10 may be any suitable portable or non-portable computing device. For example, the client device 10 may be a laptop computer, a desktop computer, a wearable device such as a smart watch or smart glasses, a virtual reality headset, etc.

The memory 120 stores an operating system (OS) 126, which can be any type of suitable mobile or general-purpose operating system. The OS 126 can include application programming interface (API) functions that allow applications to retrieve sensor readings. For example, a software application configured to execute on the computing device 10 can include instructions that invoke an OS 126 API for retrieving a current location of the client device 10 at that instant. The API can also return a quantitative indication of how certain the API is of the estimate (e.g., as a percentage).

The memory 120 also stores a browser application 122, which is configured to receive, interpret, and/or display web page information while also receiving inputs from the user as mentioned above. The browser application 122 may present web pages via the UI 132, and may present image content provided by the server device 60 in display areas of the UI 132. The memory 120 may also store other applications (not shown) which may be configured to present image content in display areas of the UI 132.

It is noted that although FIG. 1 illustrates the browser application 122 as a standalone application, the functionality of the browser application 122 also can be provided as a plug-in or extension for another software application executing on the client device 10, etc. The browser application 122 generally can be provided in different versions for different respective operating systems. For example, the maker of the client device 10 can provide a Software Development Kit (SDK) including the browser application 122 for the Android™ platform, another SDK for the iOS™ platform, etc.

In some implementations, the server device 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up an image aspect ratio adjuster 68, which can generate a first machine learning model for generating extended images and a second machine learning model for identifying ROIs within extended images.

The image aspect ratio adjuster 68 and the browser application 122 can operate as components of an image adjustment system. Alternatively, the image adjustment system can include only server-side components and simply provide the browser application 122 with web information to present, including display areas and image content to present within the display areas. In other words, image adjustment techniques in these embodiments can be implemented transparently to the browser application 122. As another alternative, the entire functionality of the image aspect ratio adjuster 68 can be implemented in browser application 122. More generally, the image aspect ratio adjuster 68 and the browser application 122 may execute on the client device 10, the server device 60, or any suitable combination of these.

For simplicity, FIG. 1 illustrates the server device 60 as only one instance of a server. However, the server device 60 according to some implementations includes a group of one or more server devices, each equipped with one or more processors and capable of operating independently of the other server devices. Server devices operating in such a group can process requests from the client device 10 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

Figure 2:
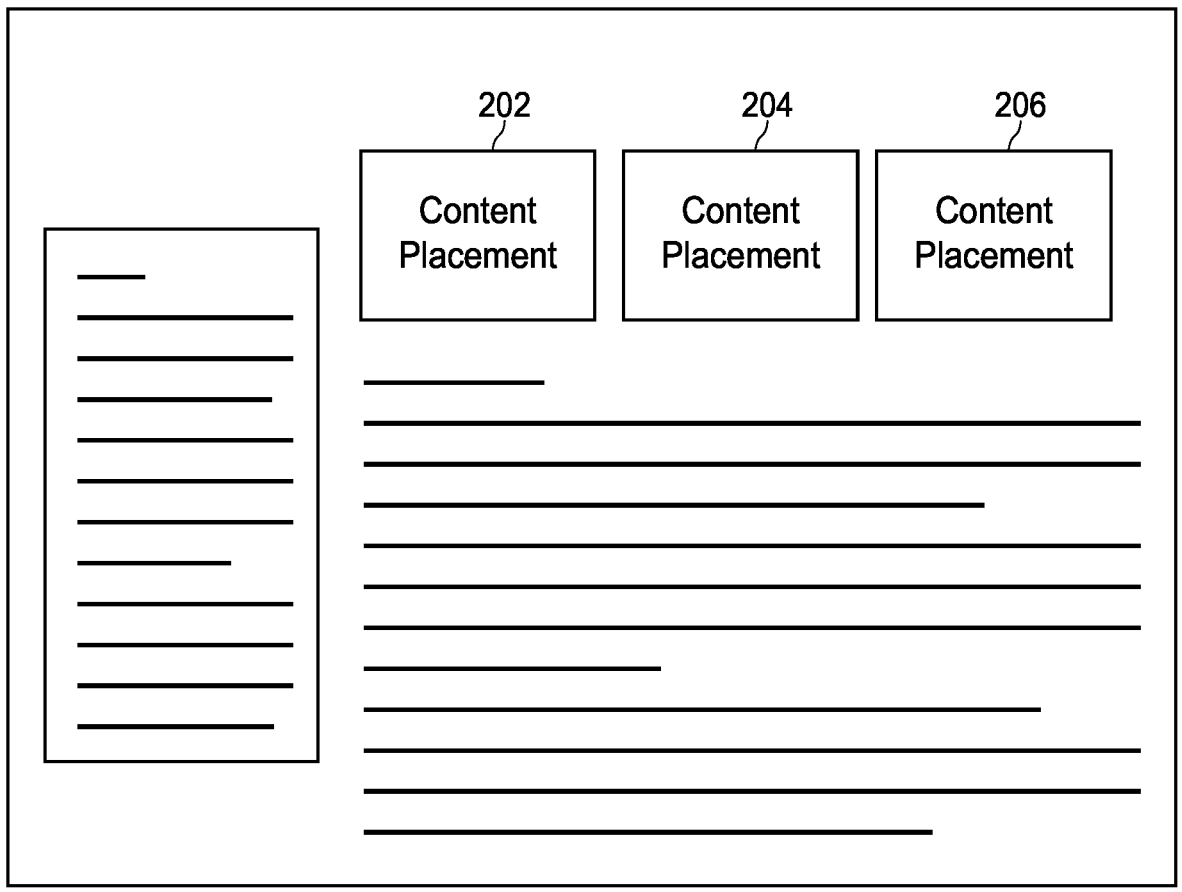
FIG. 2 illustrates an example display which may be presented on a client device, including displays areas for presenting image content from a content provider.

FIG. 2 illustrates an example web page or application screen 200 which may be presented on the client device 10. The server device 60 may generate the web page or application screen 200 and provide the generated web page or application screen 200 to the client device 10 for display. In other implementations, the server device may provide information to the client device 10 for the client device 10 to generate the web page or application screen 200, such as layout information. In any event, the web page or application screen 200 includes display areas 202-206 for placing image content within the display areas 202-206. Each of the display areas 202-206 have a particular set of dimensions and/or aspect ratio within the web page or application screen 200. The displays areas 202-206 may each have a set of borders depicting the boundaries of each display area 202-206. Accordingly. images must fit within the boundaries of the display areas 202-206. If the aspect ratio of an image differs from the aspect ratio of a display area 202-206, white space may be shown between the boundaries of the image and the boundaries of the display area 202-206.

Figure 3:
FIG. 3 illustrates an example input image provided by a content provider for presentation in a display area of a display.

FIG. 3 illustrates an example input image 300 which may be provided from a content provider 34 to the server device 60. The input image 300 has an aspect ratio of 3:4. While the input image 300 may also have a set of dimensions which differ from the dimensions of a display area for presenting the input image 300, the input image 300 may be scaled up or down to match the dimensions of the display area without changing the aspect ratio.

To adjust the aspect ratio of the input image 300 to match the aspect ratio of a display area 202-206 for presenting the input image (e.g., from 3:4 to 1:1), the server device 60 extends the input image 300 to include additional features which were not included in the input image 300. The additional features may include greater portions of objects in the input image 300, such as greater portions of people, animals, furniture, buildings, floors, walls, ceilings, trees, plants, water, etc. in the input image 300 which may be cut off in the input image 300. The input image 300 may be extended in all directions so that the extended image includes extended portions to the left, to the right, above, and below the input image 300. This allows for the input image 300 to be cropped using any suitable aspect ratio without having to cut off significant features of the input image 300.

For example, when the input image is an advertisement for a car, the input image may include the car and text describing the car in the center of the input image. The input image may have a landscape aspect ratio (e.g., 16:9) while the display area may have a portrait aspect ratio (e.g., 9:16). If the input image in its current form is cropped to the portrait aspect ratio, portions of the car and the text may be cut off. If the dimensions of the input image are altered from the landscape aspect ratio to the portrait aspect ratio without extending the input image, the car and text may be distorted by stretching the car and text vertically and condensing the car and text horizontally.

In any event, the server device and more specifically, the image aspect ratio adjuster 68 trains a first machine learning model such as a GAN model to extend images in such a way to minimize the amount in which the extended images are visually distinguishable from unextended or naturally generated images. The GAN model may include two components: a generator and a discriminator.

The generator generates an extended image by combining an input image 300 with a binary input mask that extends beyond the dimensions of the input image 300 in each direction. The input image 300 and the binary input mask may be combined by concatenating the input image 300 and the binary input mask channel-wise. The generator may generate the extended image using one or more machine learning techniques, such as neural networks, linear regression, polynomial regression, logistic regression, random forests, boosting such as adaptive boosting, gradient boosting, and extreme gradient boosting, nearest neighbors, Bayesian networks, support vector machines, etc.

The discriminator obtains a first set of unextended or naturally generated images and a second set of extended images or artificially generated images, identifies visual features of each set of images to distinguish between the sets of images, and compares the visual features of a new image to the features of each set of images to determine whether the new image is extended or not.

Visual features may be identified by detecting stable regions within an image that are detectable regardless of blur, motion, distortion, orientation, illumination, scaling, and/or other changes in camera perspective. The stable regions may be extracted from the image using a scale-invariant feature transform (SIFT), speeded up robust features (SURF), fast retina keypoint (FREAK), binary robust invariant scalable keypoints (BRISK), or any other suitable computer vision techniques. In some embodiments, keypoints may be located at high-contrast regions of objects within the image, such as edges within an object. A bounding box may be formed around a keypoint and the portion of the image created by the bounding box may be a feature.

The discriminator compares the visual features using one or more machine learning techniques, such as neural networks, linear regression, polynomial regression, logistic regression, random forests, boosting such as adaptive boosting, gradient boosting, and extreme gradient boosting, nearest neighbors, Bayesian networks, support vector machines, etc. The discriminator then provides feedback to the generator indicating whether the discriminator was able to correctly identify an extended image. If the discriminator correctly identifies an extended image, the generator adjusts the generator machine learning model for generating the extended image.

The generator and discriminator may each include neural networks trying to optimize opposing loss functions. The generator tries to maximize the probability that the discriminator will determine that an artificially generated image is naturally generated, while the discriminator tries to minimize this probability. For example, the generator and discriminator may each be trained using a combination of loss functions, such as an adversarial loss function, a reconstruction loss function to minimize the difference between known pixels from the input image and pixels in the artificially generated image, and a perceptual loss function to minimize the difference between an artificially generated image and a naturally generated image.

Figure 4A:
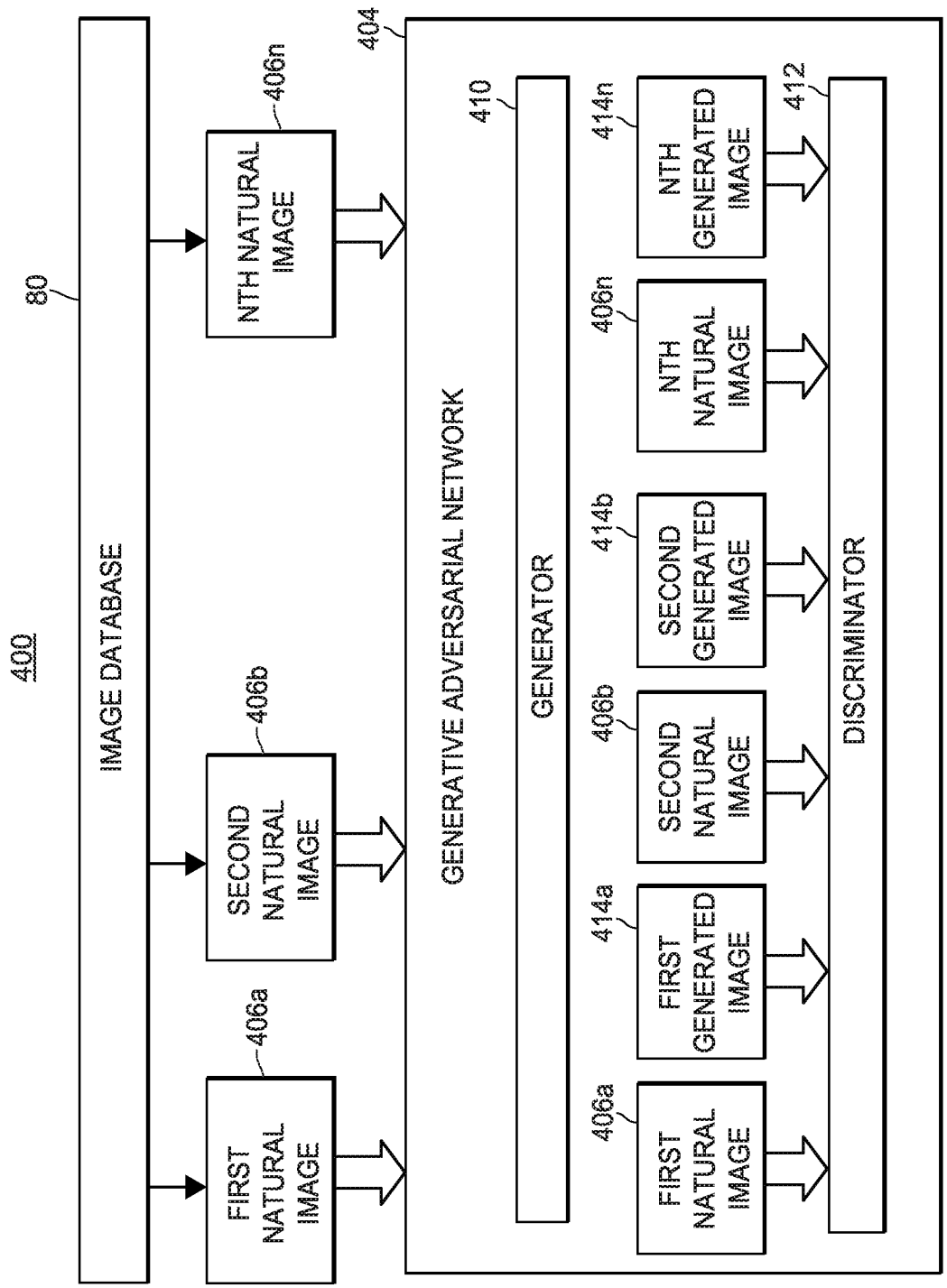
FIG. 4A illustrates is a combined block and logic diagram that illustrates the training process for a generative adversarial network (GAN) model configured to generate extended images from input images.

FIG. 4A schematically illustrates how the GAN model may be trained to generate an extended image from an input image. Some of the blocks in FIG. 4A represent data structures or memory storing these data structures, registers, or state variables (e.g., blocks 402, 406a-406n), other blocks represent hardware and/or software components (e.g., block 404, 410, 412), and other blocks represent output data (e.g., blocks 414a-414n). Input signals are represented by arrows labeled with corresponding signal names.

The generative adversarial network 404 may generate an extended image based on a generative machine learning model approach. Broadly defined, a generative machine learning model approach involves training a generative engine to learn the regularities and/or patterns in a set of input data, such that the engine may generate new examples of the input data. As the generative engine is trained on more input data, the engine's generated new examples may increase in similarity to the input data. Thus, a goal of a generative machine learning model approach is to enable the generation of new examples of the input data that are similar to the original input data.

To generate extended images, the generative adversarial network 404 receives training data which may include naturally generated images 406a-406n. The naturally generated images 406a-406n may include natural images from the real world, such as scenes and objects or images generated by a user on a computing device, such as display ad images. The naturally generated images may be stored in an image database, such as the database 80.

The generative adversarial network 404 may pass the naturally generated images 406a-406 through the generator 410 to generate extended images. More specifically, the generator 410 may analyze visual features of the naturally generated images 406a-406n to identify common features in the naturally generated images 406a-406n. The generator 410 then utilizes the common features when generating extended images or extended portions of input images, for example by training a generator neural network using the common features. For example, the generator 410 may obtain input images and combine the input images with binary input masks using the common features from the naturally generated images 406a-406n.

The binary input mask for a particular input image may have larger dimensions than the input image and may be filled in with zeroes at pixel locations corresponding to the pixel locations of the input image. In this manner, when the binary input mask is combined with the input image, the combined output will include the input image at the pixel locations filled in with zeroes in the binary input mask. The input image and the binary input mask may be combined by concatenating the input image and the binary input mask channel-wise.

For example, the generator 410 may obtain the dimensions of an input image and generate the dimensions of the binary input mask by increasing the dimensions of the input image by threshold amounts in the horizontal (x-axis) and vertical (y-axis) directions. In some implementations, the generator 410 may increase the dimensions of the input image by the same threshold amount (e.g., 50%) in both the x and y directions. In this manner, the binary input image will extend by half of the threshold amount to the right, to the left, above, and below the input image. In other implementations, the generator 410 may increase the dimensions of the input image by different threshold amounts in the x and y directions. For example, the generator 410 may determine the threshold amounts in accordance with the aspect ratio of the input image. More specifically, the generator 410 may increase the width of the input image by the product of a threshold amount (e.g., 50%) and the inverse of the aspect ratio (e.g., 9:16 when the aspect ratio is 16:9). The generator 410 may increase the length of the input image by the product of the threshold amount (e.g., 50%) and the aspect ratio (e.g., 16:9).

At pixel locations that extend beyond the input image, the generator 410 may populate the binary input mask in accordance with the common features from the naturally generated images 406a-406n. For example, the generator 410 may apply a combination of the input image with the binary input mask to the generator neural network to generate an extended image 414a.

The generator 410 may then pass the artificially generated images 414a-414n to the discriminator 412. The discriminator 412 may also receive the naturally generated images 406a-406n along with indications of the images that were artificially generated 414a-414 and the images that were naturally generated 406a-406n. The discriminator 412 may analyze visual features of the naturally generated images 406a-406n and visual features of the artificially generated images 414a-414n to generate a machine learning model (e.g., a neural network) for identifying whether an image was generated naturally or artificially. For the discriminator 412 to ensure that extended images are visually indistinguishable from naturally generated images, the discriminator 412 identifies not only whether an entire image is sufficiently similar to naturally generated images but also whether the extended portion of the image is consistent with the input image. To ensure this consistency, known pixels from the input image are included in the extended image to minimize reconstruction loss.

Then in a testing phase, the discriminator 412 analyzes the visual features of an artificially generated image 414a-414n from the generator 410 without knowing whether or not it was naturally generated. When the discriminator 412 determines that the image is artificially generated, the discriminator 412 may return the identified, artificially generated image 414a-414n to the generator 410 in a feedback loop, and/or otherwise indicate to the generator 410 that the artificially generated image 414a-414n was not sufficiently similar to the naturally generated images 406a-406n. The generator 640 may analyze the artificially generated image 414a-414n to determine visual features of the artificially generated image 414a-414n that resulted in the discriminator 412 flagging the artificially generated image 414a-414n. Thus, the generator 410 may alter the generator neural network to avoid a similar flagging result from the discriminator 412. Both the generator 410 and the discriminator 412 may train to optimize a combination of loss functions, such as an adversarial loss function, a reconstruction loss function to minimize the difference between known pixels from the input image and pixels in the artificially generated image, and a perceptual loss function to minimize the difference between an artificially generated image and a naturally generated image.

In this manner, the generative adversarial network 404 may progressively generate extended images that correspond more closely to the naturally generated images 406a-406n. In some implementations, the generator 410 and discriminator 412 are trained progressively, starting with lower resolution images and gradually adding more layers to capture higher-resolution details as training progresses. For example, initially the generator 410 may receive naturally generated images 406a-406n having low resolution and, as a result, may generate low-resolution, artificially generated images 414a-414n. The discriminator 412 may receive the low-resolution, artificially generated images 414a-414n and may compare them to the low-resolution, naturally generated images 406a-406n to train the discriminator machine learning model for identifying whether an image was generated naturally or artificially.

Then the generator 410 may receive progressively higher resolution naturally generated images 406a-406n, and as a result, may generate higher-resolution, artificially generated images 414a-414n. The discriminator 412 may receive the progressively higher-resolution, artificially generated images 414a-414n and may compare them to the progressively higher-resolution, naturally generated images 406a-406n to further train the discriminator machine learning model for identifying whether an image was generated naturally or artificially When the outputs of loss functions are within difference thresholds, or the combined output of the combined loss functions are within a combined difference threshold, the image adjustment system 100 may determine that the generative adversarial network 404 has been sufficiently trained and can generate extended images outside of the training/testing phase.

Figure 4B:
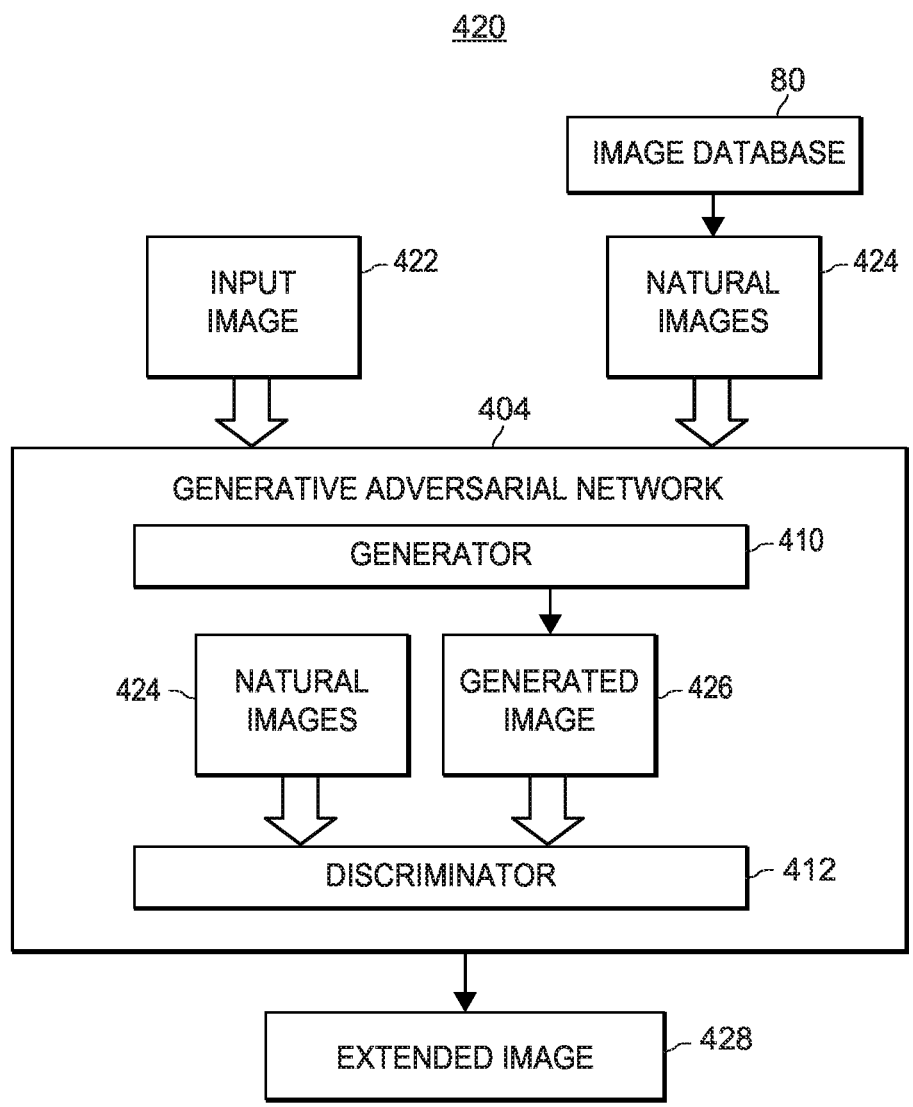
FIG. 4B is a combined block and logic diagram that illustrates the generation of an extended image from an input image using the GAN model.

To illustrate, and as shown in the example request scenario 420 of FIG. 4B, the generative adversarial network 404 may receive an input image 422. The generative adversarial network 404 may also receive naturally generated images 424 from the database 80 or may obtain the generator neural network trained using the naturally generated images 424. The generative adversarial network 404 may first pass the input image 422 to the generator 410. The generator 410 may analyze the input image 422 using the generator neural network or other machine learning model to generate a binary input mask and combine the binary input mask with the input image 422 to generate an extended image 426.

Then the generator 410 may pass the extended image 426 to the discriminator 412. The discriminator 412 may then analyze the extended image 426 using the discriminator neural network trained using the naturally generated images 424 and artificially generated images. The discriminator 412 may attempt to determine whether the extended image 426 was naturally or artificially generated, for example by applying the visual features of the extended image 426 to the neural network.

If the discriminator 412 analyzes the extended image 426 and determines that the extended image 426 was artificially generated, the discriminator 412 may flag the extended image 426, as described above. However, should the discriminator 412 not flag the extended image 426, the generative adversarial network 404 may determine that the extended image 426 is sufficiently similar to naturally generated images.

It should be appreciated that the generator 410 may generate and the discriminator 412 may flag several renderings of the extended image 426 for any particular input image 422. For example, an extended image 426 may be flagged by the discriminator 412. In that instance, the generator 410 may receive an indication that the extended image 426 was flagged by the discriminator 512, and the generator 410 may generate a subsequent rendering of the extended image 426. In embodiments, this may occur multiple times until the generator 410 generates a rendering of the extended image 426 that is not flagged by the discriminator 412.

Figure 5:
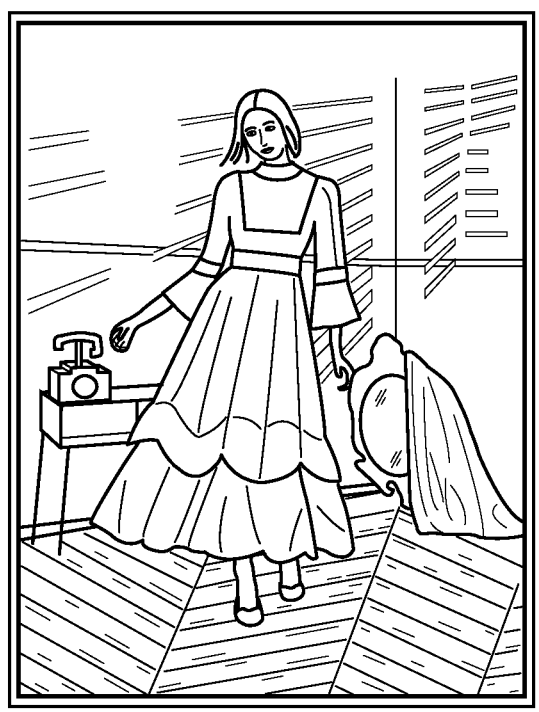
FIG. 5 is an example extended image generated by the GAN model of FIG. 4A using the input image of FIG. 3.

FIG. 5 illustrates an example extended image 500 from an input image 300 which may be generated by the GAN model. As shown in FIG. 5, the extended image 500 includes extended portions/additional features which were not included in the input image 300. For example, the extended image 500 includes a larger portion of the floor in front of the woman's foot than in the input image 300. The extended image 500 also includes a larger portion of the wall above the woman's head than in the input image 300. Moreover, the extended image 500 includes larger portions of the area to the left and right of the woman than in the input image 300, including additional portions of background objects.

In some scenarios, an extended image generated by the GAN model may have visual artifacts. To reduce visual artifacts in an extended image in these scenarios, the image aspect ratio adjuster 68 utilizes an augmented inference process.

Figure 6:
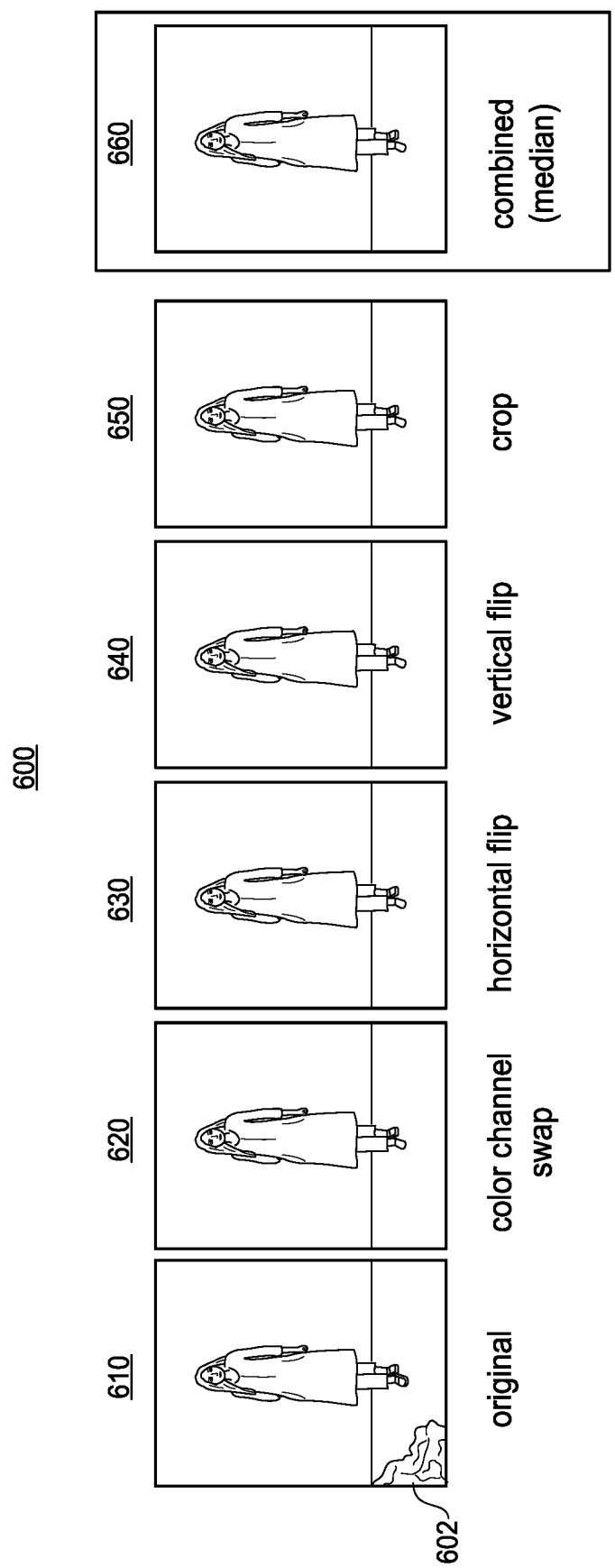
FIG. 6 illustrates example steps of an augmented inference process for reducing artifacts in an extended image.

FIG. 6 illustrates example steps 610-660 of the augmented inference process. The extended image 610 may include visual artifacts 602 resulting in a low image quality. To reduce the visual artifacts and improve the image quality, the image aspect ratio adjuster 68 applies multiple transformations to the input image to generate multiple transformed images including for example, a color channel swap 620, a horizontal flip 630, a vertical flip 640, and cropping 650.

Then the image aspect ratio adjuster 68 applies each transformed image to the GAN 404 to generate multiple transformed, extended images. Next, the image aspect ratio adjuster 68 applies reverse transformations to each transformed, extended image to generate multiple extended images. For example, for the extended image that was transformed using a color channel swap 620, the image aspect ratio adjuster 68 applies a reverse color channel swap. For the extended image that was transformed using a horizontal flip 630, the image aspect ratio adjuster 68 flips the image back to its original position, etc. The images 620-650 may depict the states of the respective images after they have been reverse transformed.

Then the image aspect ratio adjuster 68 combines the extended images 620-650 using a median filter to generate a combined, extended image. For example, at each pixel location in the extended images 620-650, the median filter may identify the median pixel value as the pixel value for the combined, extended image at that pixel location. By applying multiple transformations to the input images and combining the extended images in this manner, artifacts are significantly reduced.

In addition to generating an extended image, the image aspect ratio adjuster 68 crops the extended image using the aspect ratio of the display area for presenting the image. The server device 60 may obtain the aspect ratio of the display area from the layout of the web page or application screen on which the image will be presented. In other implementations, the server device 60 selects the aspect ratio of the display area. For example, the server device 60 may identify sections of the web page or application screen which include empty space and may generate the display area in one of these sections. In another example, the server device 60 may generate the web page or application screen and may generate the display area.

In any event, to crop the extended image using the aspect ratio of the display area without cutting off significant visual features from the extended image, such as text, an object, or a portion thereof, the image aspect ratio adjuster 68 identifies a region of interest within the extended image. The image aspect ratio adjuster 68 may identify the region of interest using one or more machine learning techniques, such as neural networks, linear regression, polynomial regression, logistic regression, random forests, boosting such as adaptive boosting, gradient boosting, and extreme gradient boosting, nearest neighbors, Bayesian networks, support vector machines, etc.

The image aspect ratio adjuster 68 may then generate a second machine learning model for identifying ROIs within extended images. The image aspect ratio adjuster 68 may train the second machine learning model using a set of training images including first portions of the images classified as within an ROI and second portions of the images classified as not being within an ROI. The image aspect ratio adjuster 68 may analyze the first and second portions to identify visual features of each portion and generates the machine learning model based on the visual features in each portion. Then the image aspect ratio adjuster 68 may apply visual features of an extended image to the second machine learning model to identify the ROI within the extended image.

Figure 7:
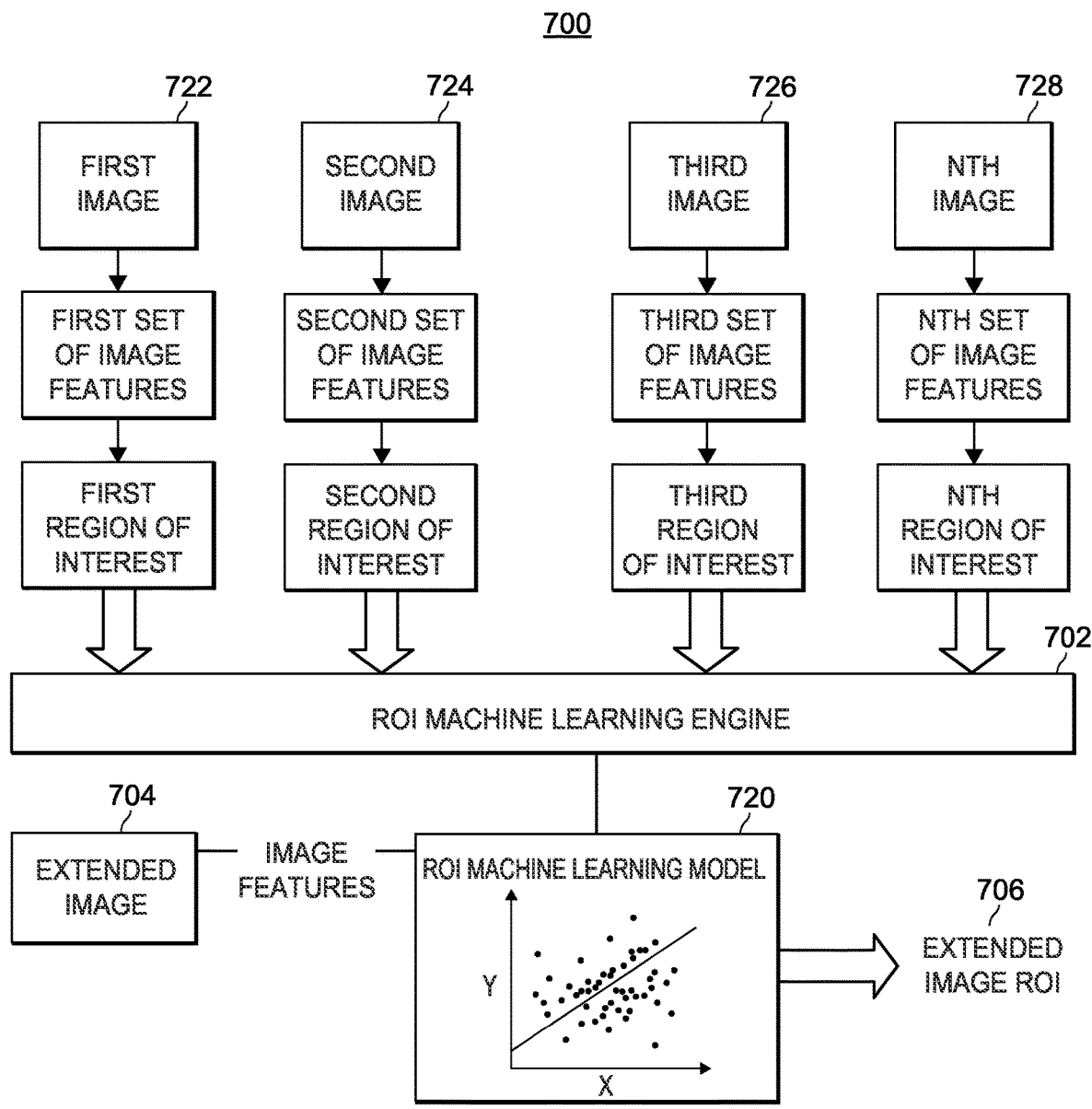
FIG. 7 is a combined block and logic diagram that illustrates a machine learning model for identifying a region of interest within an extended image for automatically cropping the extended image using the aspect ratio of a display area around the identified region of interest.

FIG. 7 schematically illustrates how the image aspect ratio adjuster 68 of FIG. 1 identifies the ROI for an extended image in an example scenario. Some of the blocks in FIG. 7 represent hardware and/or software components (e.g., block 702), other blocks represent data structures or memory storing these data structures, registers, or state variables (e.g., blocks 704, 712, 720), and other blocks represent output data (e.g., block 706). Input signals are represented by arrows labeled with corresponding signal names.

The machine learning engine 702 of FIG. 7 may be included within the image aspect ratio adjuster 68 to generate the ROI machine learning model 720. To generate the ROI machine learning model 720, the machine learning engine 702 receives training data including an indication of a first image 722 having a first ROI and a first set of visual features including a first subset of visual features corresponding to the ROI and a second subset of visual features corresponding to the remaining portions of the first image 722. The training data also includes an indication of a second image 724 having a second ROI and a second set of visual features including a first subset of visual features corresponding to the ROI and a second subset of visual features corresponding to the remaining portions of the second image 724. Furthermore, the training data includes an indication of a third mage 726 having a third ROI and a third set of visual features including a first subset of visual features corresponding to the ROI and a second subset of visual features corresponding to the remaining portions of the third image 726. Still further, the training data includes an indication of an nth image 728 having an nth ROI and an nth set of visual features including a first subset of visual features corresponding to the ROI and a second subset of visual features corresponding to the remaining portions of the nth image 728.

While the example training data includes indications of four images 722-728, this is merely an example for ease of illustration only. The training data may include any number of images assigned ROIs by any number of users.

The machine learning engine 702 then analyzes the training data to generate an ROI machine learning model 720 for identifying an ROI in an image. While the ROI machine learning model 720 is illustrated as a linear regression model, the ROI machine learning model may be another type of regression model such as a logistic regression model, a decision tree, several decision trees, a neural network, a hyperplane, or any other suitable machine learning model.

In any event, in response to receiving an extended image 704, the image aspect ratio adjuster 68 identifies visual features of the extended image 704. The image aspect ratio adjuster 68 then applies the visual features to the ROI machine learning model 720 to identify the ROI 706 in the extended image.

In response to identifying the ROI 706, the image aspect ratio adjuster 68 selects a portion of the extended image for cropping the extended image around the identified ROI using the aspect ratio of the display area. For example, the image aspect ratio adjuster 68 may generate a first box around the ROI. The image aspect ratio adjuster 68 may also generate a second box having the same aspect ratio as the display area for cropping the extended image. The image aspect ratio adjuster 68 may adjust the position of the second box so that the first box fits within the second box. In some implementations, the second box must fit within the boundaries of the extended image.

If the first box which indicates the ROI fits within the second box which has the same aspect ratio as the display area, the image aspect ratio adjuster 68 may automatically crop the extended image using the second box. If the first box does not fit within the second box, the image aspect ratio adjuster 68 may continue moving the position of the second box until the first box fits within the second box. If the image aspect ratio adjuster 68 has moved the position of the second box to each possible position within the boundaries of the extended image, the image aspect ratio adjuster 68 may adjust the scale of the second box without changing the aspect ratio. For example, the image aspect ratio adjuster 68 may increase the size of the second box while maintaining the same width to length ratio. The image aspect ratio adjuster 68 may continue adjusting the position and/or size of the second box until the first box fits within the second box. Then the image aspect ratio adjuster 68 may automatically crop the extended image using the second box.

Figure 8:
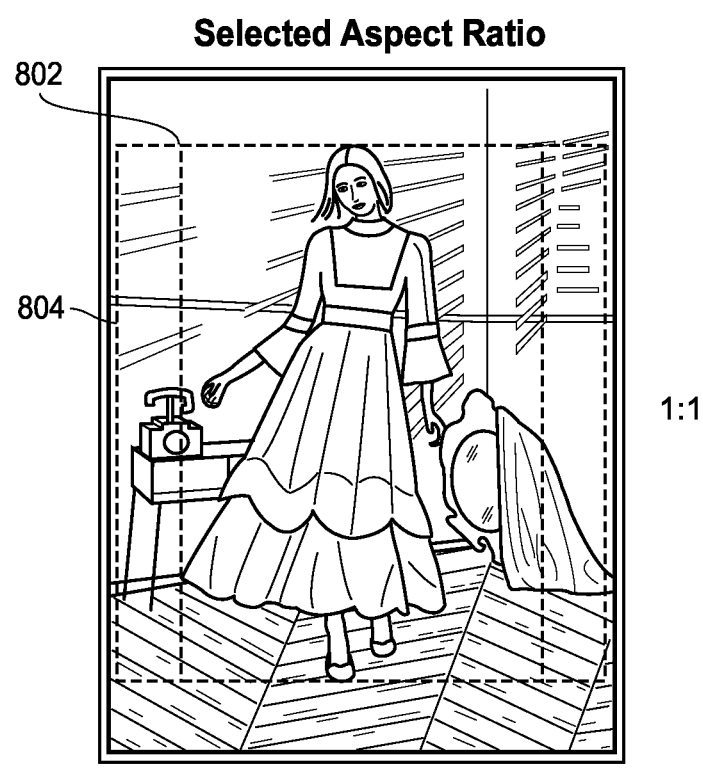
FIG. 8 is an example extended image cropped around an identified region of interest using a selected aspect ratio.

FIG. 8 illustrates an example extended image 800 cropped using a selected aspect ratio (e.g., 1:1) around an identified region of interest. The first box 802 indicates the identified region of interest and the second box 804 indicates the area in which to crop the extended image 800. As shown in FIG. 8, the first box 802 fits within the second box 804, and the second box 804 fits within the boundaries of the extended image 800. Accordingly, the image aspect ratio adjuster 68 may automatically crop the extended image using the second box 804. In this manner, the input image 300 may be transformed from having a first aspect ratio of 3:4 to a second aspect ratio of 1:1 which matches the aspect ratio of the display area for presenting the input image 300.

Figure 9:
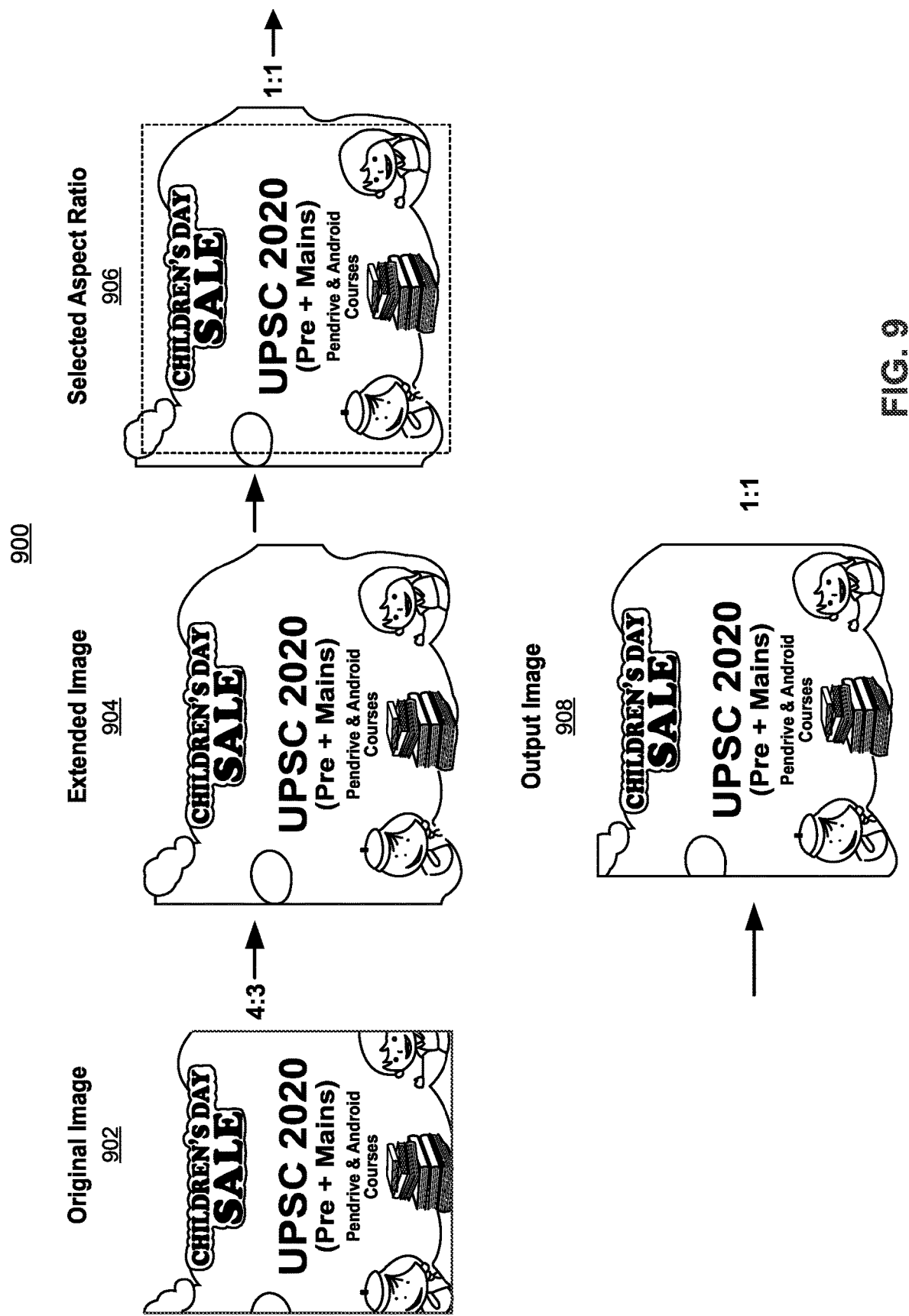
FIG. 9 illustrates an example input image at each stage of the image adjustment process.

FIG. 9 illustrates an example input image 900 at each stage 902-908 of the image adjustment process. At first, the input image 900 is provided from the context provider 34 to the server device 60 as an original image 902. The original image 902 has an aspect ratio of 4:3. Then the input image 900 is extended, for example using a GAN to generate the extended image 904. The extended image 904 includes additional features which were not included in the original image 902. For example, partial bubbles in the original image 902 become full bubbles in the extended image 904, a partial stack of books in the original image 902 becomes a full stack of books in the extended image 904, and partial cartoons of kids in the original image 902 become more completed versions of the kids in the extended image 904.

The server device 60 then selects an aspect ratio 906 (e.g., 1:1) for cropping the extended image 904 around an identified region of interest based on the aspect ratio for a display area for presenting the image 900. The server device 60 may generate a rectangular box with dimensions matching the selected aspect ratio and may place the rectangular box over the extended image 904, such that the identified region of interest fits within the rectangular box. Then the server device 60 crops the extended image 904 using the rectangular box to generate the output image 908. The output image has an aspect ratio of 1:1.

Figure 10:
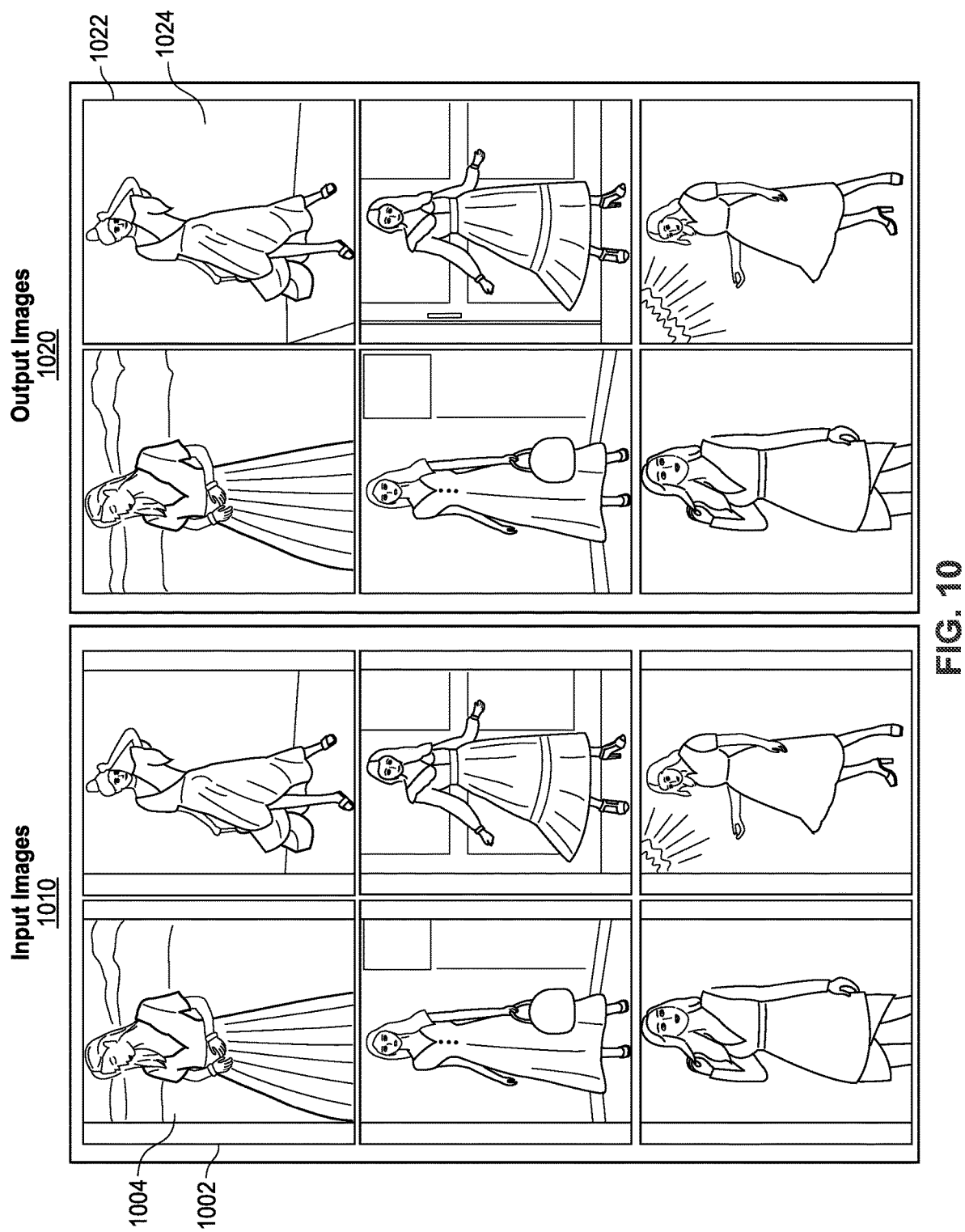
FIG. 10 illustrates an example comparison of input images to adjusted output images within respective display areas.

FIG. 10 illustrates an example comparison of input images 1010 to adjusted output images 1020 within respective display areas. For example, an input image 1004 has a different aspect ratio than the display area 1002 in which it is presented. Accordingly, there is white space in the display area 1002 between the boundaries of the input image 1004 and the boundaries of the display area 1002. On the other hand, an output image 1024, generated by extending the input image using a GAN and automatically cropping the input image around an identified ROI, has the same aspect ratio as the display area 1022 in which it is presented. Accordingly, there is no white space in the display area 1022, and the output image 1024 is not distorted or missing a part of the region of interest.

Figure 11:
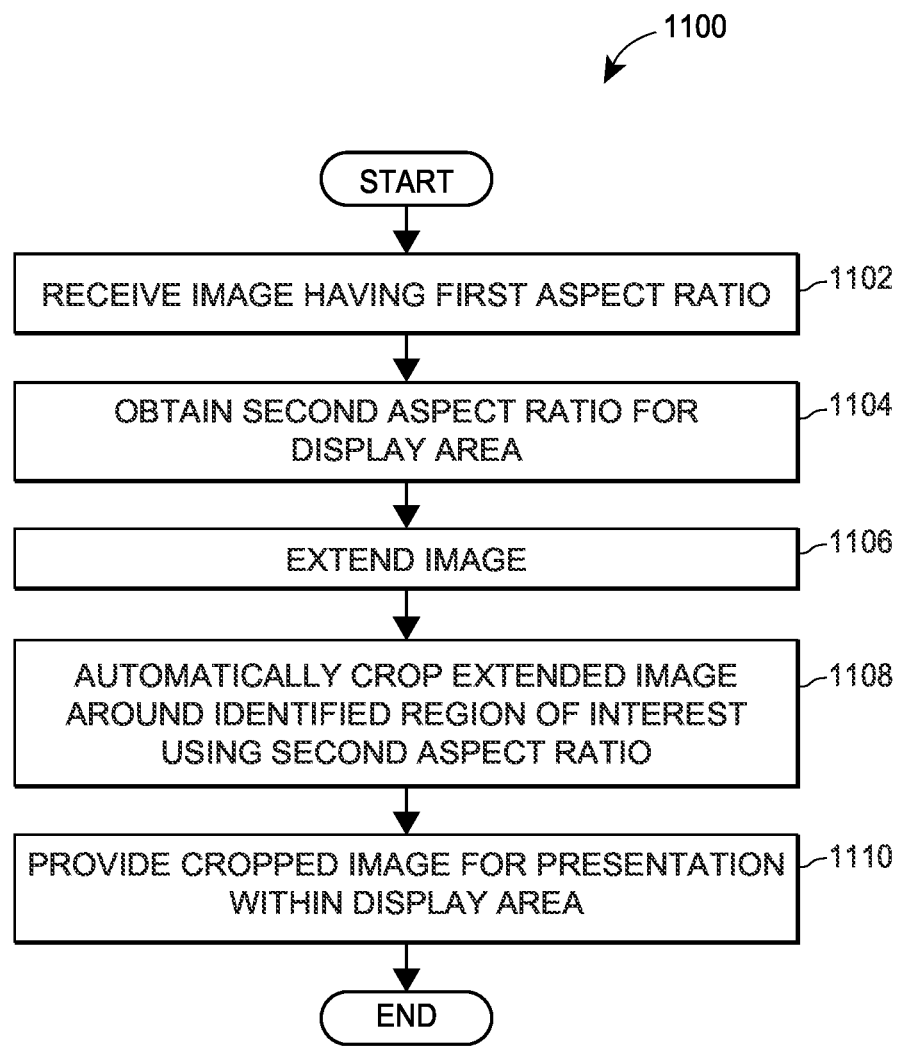
FIG. 11 is a flow diagram of an example method for adjusting an aspect ratio of an image, which can be implemented in a computing device that operates in, or cooperates with, an image adjustment system.

FIG. 11 illustrates a flow diagram of an example method 1100 for adjusting an aspect ratio of an image. The method can be implemented in a set of instructions stored on a computer-readable memory and executable at one or more processors of the server device 60. For example, the method can be implemented by the image aspect ratio adjuster 68.

At block 1102, the server device 60 receives an input image have a first aspect ratio, for example from a content provider. The input image may be image content such as an advertisement, photograph, etc. for presenting within a display area of a display, such as a web page or application screen similar to the web page or application screen 200 as shown in FIG. 2.

At block 1104, the server device 60 obtains a second aspect ratio for the display area which is different from the first aspect ratio. For example, the server device 60 may obtain the second aspect ratio for the display area from the layout of the web page or application screen on which the input image will be presented. In other implementations, the server device 60 selects the second aspect ratio of the display area. For example, the server device 60 may identify sections of the web page or application screen which include empty space and may generate the display area in one of these sections. In another example, the server device 60 may generate the web page or application screen and may generate the display area.

At block 1106, the server device 60 extends the input image to generate an extended image that includes extended portions/additional features which were not included in the input image without blurring or color padding the image. In some implementations, the server device 60 may extend the input image by generating an extended image having dimensions that exceed the dimensions of the input image by the same threshold amount (e.g., 50%) in both the x and y directions. In this manner, the extended image will extend by half of the threshold amount to the right, to the left, above, and below the input image. In other implementations, the dimensions of the extended image may exceed the dimensions of the input image by different threshold amounts in the x and y directions. For example, the server device 60 may determine the threshold amounts in accordance with the aspect ratio of the input image. More specifically, the width of the extended image may exceed the width of the input image by the product of a threshold amount (e.g., 50%) and the inverse of the aspect ratio (e.g., 9:16 when the aspect ratio is 16:9). The length of the extended image may exceed the length of the input image by the product of the threshold amount (e.g., 50%) and the aspect ratio (e.g., 16:9).

The server device 60 may train a GAN to generate artificially generated images to minimize the perceptible difference between the artificially generated images and naturally generated images, such that they are visually indistinguishable from naturally generated images. The server device 60 may then apply the input image and a binary input mask having the increased dimensions to the GAN to generate the extended image.

At block 1108, the server device 60 automatically crops the extended image around an identified ROI using the second aspect ratio, so that the aspect ratio of the cropped image matches the aspect ratio of the display area. More specifically, the server device 60 may train an ROI machine learning model for identifying ROIs in images. Then the server device 60 may apply the extended image to the ROI machine learning model to identify the ROI in the extended image.

In response to identifying the ROI, the image aspect ratio adjuster 68 selects a portion of the extended image for cropping the extended image around the identified ROI using the aspect ratio of the display area. For example, the server device 60 may generate a first box around the ROI. The server device 60 may also generate a second box having the same aspect ratio as the display area for cropping the extended image. The server device 60 may adjust the position of the second box so that the first box fits within the second box. In some implementations, the second box must fit within the boundaries of the extended image. If the first box which indicates the ROI fits within the second box which has the same aspect ratio as the display area, the server device 60 may automatically crop the extended image using the second box.

In other implementations, the server device 60 does not automatically crop the extended image using the second aspect ratio, and instead extends the input image to generate an extended image having the second aspect ratio without needing to crop the extended image.

Then at block 1110, the server device 60 provides the cropped image or at least a portion of the extended image having the second aspect ratio to a client device 10 for presentation within the display area of the display. The client device 10 may present the cropped image via a browser application 122 or another suitable application for presenting the display.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The method 1100 may include one or more function blocks, modules, individual functions or routines in the form of tangible computer-executable instructions that are stored in a computer-readable storage medium and executed using a processor of a computing device (e.g., a server device, a personal computer, a smart phone, a tablet computer, a smart watch, a mobile computing device, or other client computing device, as described herein). The computer-readable storage medium may be non-transitory. The method 1100 may be included as part of any backend server (e.g., a map data server, a navigation server, or any other type of server computing device, as described herein), client computing device modules of the example environment, for example, or as part of a module that is external to such an environment. Though the figures may be described with reference to the other figures for case of explanation, the method 1100 can be utilized with other objects and user interfaces. Furthermore, although the explanation above describes steps of the method 1100 being performed by specific devices (such as a server device 60 or client device 10), this is done for illustration purposes only. The blocks of the method 1100 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for adjusting the aspect ratio of an image through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for adjusting an aspect ratio of an image, the method comprising:
   receiving, at one or more processors, an image having a first aspect ratio;
   obtaining, by the one or more processors, a selection of a second aspect ratio for a display area of a display in which to present the image, wherein the second aspect ratio is different from the first aspect ratio;
   extending, by the one or more processors, the image beyond at least one dimension of the display area to include one or more additional features which were not included in the image using a first machine learning model, such that the extended image can be cropped into a plurality of aspect ratios;
   automatically selecting, by the one or more processors, a region of interest within the extended image using a second machine learning model;
   automatically cropping, by the one or more processors, the extended image around the selected region of interest by selecting a portion of the extended image that has an aspect ratio which matches the second aspect ratio of the display area; and
   providing, by the one or more processors, the cropped image for presentation within the display area of the display.

2. The method of claim 1, wherein extending the image includes:
generating, by the one or more processors, the extended image using a generative adversarial network (GAN), wherein the extended image includes the image and one or more extended portions.

3. The method of claim 2, wherein the GAN includes a generator for generating extended images and a discriminator for distinguishing between naturally generated and artificially generated images.

4. The method of claim 3, further comprising:
training, by the one or more processors, the generator using the naturally generated images; and
training, by the one or more processors, the discriminator using a first set of visual features of the naturally generated images, and a second set of visual features of the artificially generated images.

5. The method of claim 3, wherein generating the extended image using the GAN includes:
applying, by the one or more processors, the image to the generator to generate the extended image;
applying, by the one or more processors, the extended image to the discriminator to determine whether the discriminator can distinguish the extended image from the naturally generated images; and
in response to determining that the discriminator cannot distinguish the extended image from the naturally generated images, using the extended image to adjust the aspect ratio.

6. The method of claim 5, further comprising:
in response to determining that the discriminator can distinguish the extended image from the naturally generated images, providing the extended image to the generator for further training.

7. The method of claim 2, wherein generating the extended image includes:
applying, by the one or more processors, a plurality of transformations to the image to generate a plurality of transformed images;
applying, by the one or more processors, the plurality of transformed images to the GAN to generate a plurality of transformed, extended images;
applying, by the one or more processors, a plurality of respective reverse transformations to the plurality of transformed, extended images to generate a plurality of extended images; and
combining, by the one or more processors, the plurality of extended images via a median filter to generate the extended image.

8. A computing device for adjusting an aspect ratio of an image, the computing device comprising:
one or more processors; and
a non-transitory computer-readable memory coupled to the one or more processors and storing instructions thereon that, when executed by the one or more processors, cause the computing device to:
receive an image having a first aspect ratio;
obtain a selection of a second aspect ratio for a display area of a display in which to present the image, wherein the second aspect ratio is different from the first aspect ratio;
extend the image beyond at least one dimension of the display area to include one or more additional features which were not included in the image using a first machine learning model, such that the extended image can be cropped into a plurality of aspect ratios;
automatically select a region of interest within the extended image using a second machine learning model;
automatically crop the extended image around the selected region of interest by selecting a portion of the extended image that has an aspect ratio which matches the second aspect ratio of the display area; and
provide the cropped image for presentation within the display area of the display.

9. The computing device of claim 8, wherein to extend the image, the instructions cause the computing device to:
generate the extended image using a generative adversarial network (GAN), wherein the extended image includes the image and one or more extended portions.

10. The computing device of claim 9, wherein the GAN includes a generator for generating extended images and a discriminator for distinguishing between naturally generated and artificially generated images.

11. The computing device of claim 10, wherein the instructions further cause the computing device to:
train the generator using naturally generated images; and
train the discriminator using a first set of visual features of the naturally generated images, and a second set of visual features of the artificially generated images.

12. The computing device of claim 10, wherein to generate the extended image using the GAN, the instructions cause the computing device to:
apply the image to the generator to generate the extended image;
apply the extended image to the discriminator to determine whether the discriminator can distinguish the extended image from the naturally generated images; and
in response to determining that the discriminator cannot distinguish the extended image from the naturally generated images, use the extended image to adjust the aspect ratio.

13. The computing device of claim 12, wherein the instructions further cause the computing device to:
in response to determining that the discriminator can distinguish the extended image from the naturally generated images, provide the extended image to the generator for further training.

14. The computing device of claim 9, wherein to generate the extended image, the instructions cause the computing device to:
apply a plurality of transformations to the image to generate a plurality of transformed images;
apply the plurality of transformed images to the GAN to generate a plurality of transformed, extended images;
apply a plurality of respective reverse transformations to the plurality of transformed, extended images to generate a plurality of extended images; and
combine the plurality of extended images via a median filter to generate the extended image.

15. A non-transitory computer-readable medium storing instructions that, when executed by one or more processors in a computing device, cause the one or more processors to:
receive an image having a first aspect ratio;
obtain a second aspect ratio for a display area of a display in which to present the image, wherein the second aspect ratio is different from the first aspect ratio;
extend the image beyond at least one dimension of the display area to include one or more additional features which were not included in the image using a first machine learning model without blurring or color padding the image, such that the extended image can be cropped into a plurality of aspect ratios;

automatically select a region of interest within the extended image using a second machine learning model; and provide at least a portion of the extended image including the selected region of interest having an aspect ratio which matches the second aspect ratio for presentation within the display area of the display.

16. The computer-readable medium of claim 15, wherein the extended image include a plurality of additional features which were not included in the image.

17. The computer-readable medium of claim 15, wherein the extended image includes a greater portion of an object in the image.

18. The computer-readable medium of claim 15, wherein to extend the image, the instructions cause the one or more processors to:

generate the extended image using a generative adversarial network (GAN), wherein the extended image includes the image and one or more extended portions.

19. The computer-readable medium of claim 18, wherein the GAN includes a generator for generating extended images and a discriminator for distinguishing between naturally generated and artificially generated images.

20. The computer-readable medium of claim 19, wherein the instructions further cause the one or more processors to:

train the generator using naturally generated images; and train the discriminator using a first set of visual features of the naturally generated images, and a second set of visual features of the artificially generated images.

\* \* \* \* \*